United States Patent [19]

Schnüpke et al.

[11] Patent Number: 5,730,673
[45] Date of Patent: Mar. 24, 1998

[54] HYDRAULIC TENSIONING ARRANGEMENT FOR TENSIONING FLEXIBLE DRIVE MEANS FOR A CAMSHAFT

[75] Inventors: Hubert Schnüpke, Stuttgart; Helmut Kronowiecki, Notzingen; Erhard Rau, Weilhem; Robert Gülpen, Stuttgart; Klaus Bruchner, Ebersbach, all of Germany

[73] Assignee: Mercedes-Benz AG, Stuttgart, Germany

[21] Appl. No.: 762,524

[22] Filed: Dec. 9, 1996

[30] Foreign Application Priority Data

Dec. 13, 1995 [DE] Germany ............ 195 46 557.1

[51] Int. Cl.⁶ ........................................... F16H 7/08
[52] U.S. Cl. ........................ 474/110; 474/111; 474/138
[58] Field of Search ........................ 474/91, 110, 111, 474/138, 101

[56] References Cited

U.S. PATENT DOCUMENTS

| | | | |
|---|---|---|---|
| 5,033,421 | 7/1991 | Shimada et al. | 123/90.27 |
| 5,154,144 | 10/1992 | Okui et al. | 123/90.27 |
| 5,199,395 | 4/1993 | Mizumura et al. | 123/196 AB |
| 5,333,578 | 8/1994 | Shimura et al. | 474/104 X |
| 5,577,970 | 11/1996 | Smith et al. | 474/110 |

FOREIGN PATENT DOCUMENTS 40 35 202  5/1991  Germany.
40 35 254  5/1991  Germany.

*Primary Examiner*—Roger J. Schoeppel
*Attorney, Agent, or Firm*—Klaus J. Bach

[57] ABSTRACT

In a hydraulic tensioning arrangement for tensioning a flexible drive for a camshaft of an internal combustion engine including a crankcase and a cylinder head wherein a main lubricating oil channel extends longitudinally along the inside of the crankcase and has an opening at the front end of the crankcase, a hydraulic housing with a cylinder receiving a plunger is mounted on the front end of the crankcase so as to cover the main lubricating oil channel opening and passage elements are provided for supplying oil from the main lubricating oil channel to the cylinder to bias the plunger against tensioning elements engaging the flexible drive.

4 Claims, 2 Drawing Sheets

HYDRAULIC TENSIONING ARRANGEMENT FOR TENSIONING FLEXIBLE DRIVE MEANS FOR A CAMSHAFT

BACKGROUND OF THE INVENTION

The invention relates to a hydraulic tensioning arrangement for tensioning a flexible drive means for a camshaft of an internal combustion engine including a cylinder and piston actuated by the engine lubricating oil for engaging a tensioning rail with the drive means.

DE 40 35 202 A1 discloses such a tensioning arrangement including a hydraulic cylinder to which lubricating oil from the lubricating oil circuit of the engine is supplied to force a piston with a tensioning rail into engagement with a drive chain. A special oil channel is provided in the engine housing for supplying the oil to the hydraulic cylinder. The arrangement of the oil channels for supplying oil to the tensioning device is quite complicated and therefore has to be made in a special manufacturing step. Such a tensioning arrangement is therefore relatively expensive.

For general background information reference is further made to DE 40 35 254 A.

It is the object of the present invention to provide a tensioning arrangement for tensioning a camshaft drive belt or chain of such a design that oil can be supplied to the tensioning arrangement in a simple and inexpensive manner.

SUMMARY OF THE INVENTION

In a hydraulic tensioning arrangement for tensioning a flexible drive means for a camshaft of an internal combustion engine including a crankcase and a cylinder head wherein a main lubricating oil channel extends longitudinally along the inside of the crankcase and has an opening at the front end of the crankcase, a hydraulic housing with a cylinder receiving a plunger is mounted on the front end of the crankcase so as to cover the main lubricating oil channel opening and passage means are provided for supplying oil from the main lubricating oil channel to the cylinder to bias the plunger against tensioning means engaging the flexible drive means.

The arrangement according to the invention provides for a relatively simple tensioning structure and also simplifies the engine housing. No special bores for supplying oil to the tensioning means are required since the oil admission passage is cast into the crankcase. Furthermore, the oil admission passage is in the form of a throttle passage which, by its flow cross-section, controls the amount of lubricating oil permitted to pass. The oil passage extends in the engine housing but is covered by the tensioning means so that no special cover elements for the oil passage are needed. Further advantages and a preferred embodiment of the invention will be described below on the basis of the accompanying drawings.

DESCRIPTION OF A PREFERRED EMBODIMENT

Figure 1:
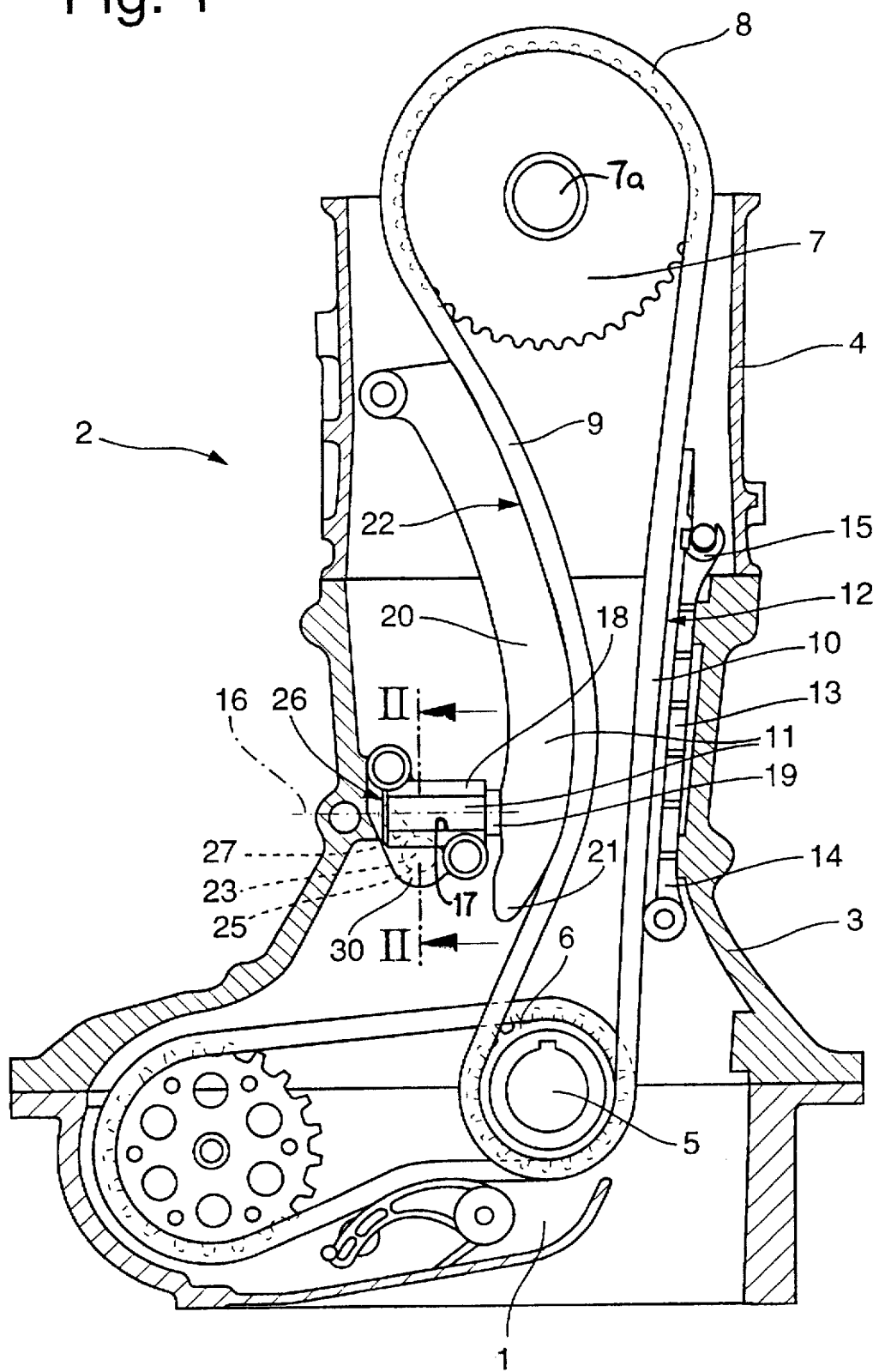
FIG. 1 is a front view of the hydraulic tensioning arrangement for a camshaft drive chain.

In FIG. 1, the front end of an engine housing 2 on which the camshaft drive means is disposed is indicated by the numeral 1. The engine housing 2 comprises a crankshaft housing portion 3 (cylinder block) and a cylinder head 4.

In the crankshaft housing 3 a crankshaft 5 is supported on the front end of which a drive gear 6 is mounted for rotation with the crankshaft 5. On the cylinderhead 4, a camshaft 7a is supported and another gear 7 is mounted on the camshaft 7a for rotation therewith. The gears 6, 7 are chain gears. The camshaft 7a is driven by the crankshaft 5 by way of a flexible drive means 8 which, in the present case, is a timing chain which extends around the drive gear of the crankshaft 5 and the drive gear 7 of the camshaft 7a.

The crankshaft 5 rotates in the direction as indicated by the arrow so that the timing chain 8 forms a loose trum 9 and a load trum 10. At the side of the loose trum 9, the timing chain is tensioned by a tensioning structure 11 described below in greater detail. At the outside 12 of the load trum 10, there is a guiding slide track 13 which is supported at one end 14 thereof in the crank case 3 and at the other end 15 on the cylinderhead 4.

The tensioning structure 11 includes a plunger 19 which is movably disposed in a cylindrical bore 17 of a hydraulic housing 18 extending along a transverse axis 16 of the engine and a tensioning rail structure 20. The tensioning rail structure 20 is pivotally supported on the cylinderhead and has a free end 21. It is somewhat curved and abuts, with its curved surfaces, the outer side 22 of the loose trum 9 of the timing chain 8. Lubricating oil can be admitted to the cylindrical bore 17 for biasing the plunger 19 toward the tensioning rail structure 20 which is engaged by the plunger 19 near its free end 21. In this manner, the tensioning rail structure is biased against the timing chain with a pressure provided by the oil lubricating circuit, whereby the timing chain 8 is subjected to a predetermined tension.

Figure 2:
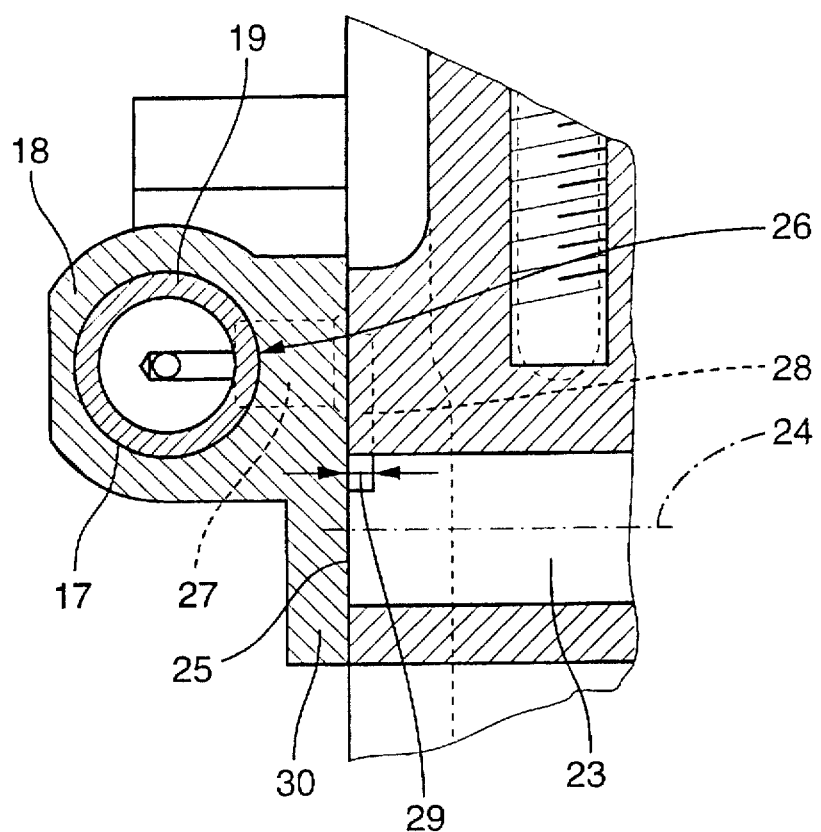
FIG. 2 is a cross-sectional view of the tensioning structure taken along line II—II of FIG. 1.

The crank case 3 includes a main oil channel 23 for supplying lubricating oil to crankshaft bearings. This main oil channel 23 extends in the direction of a longitudinal axis 24 of the crankcase 3 (FIG. 2). It is formed during casting and is subsequently finish-drilled. At the opposite ends of the crankcase 3, the main oil channel 23 is normally plugged by metal plugs or appropriate other plugging means (such as a ball or a screw).

In order to avoid this assembly step, the hydraulic housing 18 is mounted on the front side 1 of the crankcase 3 in such a way that it covers the front end opening 25 of the main oil channel 23. As a result the front end of the main oil channel 23 does not need to be plugged that is no plugging element is needed.

As shown in FIG. 2, lubricating oil is supplied to the cylinder 17 at the end 26 thereof remote from the chain 9 by way of an admission passage 27 extending radially in the hydraulic housing 18. The cylinder bore 17 and the main oil channel 23 are displaced with respect to each other. The cylinder bore 17 extends above the main oil channel 23 and is in communication with the main oil channel 23 by way of a groove 28. The groove 28 is cast into the engine housing and forms a throttling passage which has a depth 29 and a cross-section so selected as to limit the amount of lubricating oil permitted to pass. At the side of the hydraulic housing 18 adjacent the crankshaft, there is a flange portion 30 abutting the crankshaft 3 and covering the opening 25 of the oil channel 23.

What is claimed is:

1. A hydraulic tensioning arrangement for tensioning a flexible drive means for a camshaft of an internal combustion engine including a crankcase and a cylinderhead mounted on said crankcase, said crankcase including a main lubricating oil channel extending longitudinally along the inside of said crankcase for supplying lubricating oil to crankshaft bearings, said crankcase having a front end and said lubricating oil channel being open at said front end of said crankcase, a hydraulic housing with a cylinder receiving a plunger mounted on said front end of said crankcase so as to cover said lubricating oil channel, passage means providing for communication between said main lubricating oil channel and said cylinder for supplying lubricating oil to said cylinder for biasing said plunger and said tensioning structure into engagement with said flexible drive means.

2. A hydraulic tensioning arrangement according to claim 1, wherein said flexible drive means includes a loose trum and said tensioning structure is a tensioning rail engaging said loose trum.

3. A hydraulic tensioning arrangement according to claim 2, wherein said tensioning rail is pivotally supported on said cylinderhead and has a free end adjacent said plunger.

4. A hydraulic tensioning arrangement according to claim 1, wherein said hydraulic housing with said cylinder is displaced with respect to said main lubricating oil channel and said communication means is a groove which is formed in said hydraulic housing and has a cross-section sufficiently small to act as a throttling means.

* * * * *